UNITED STATES PATENT OFFICE.

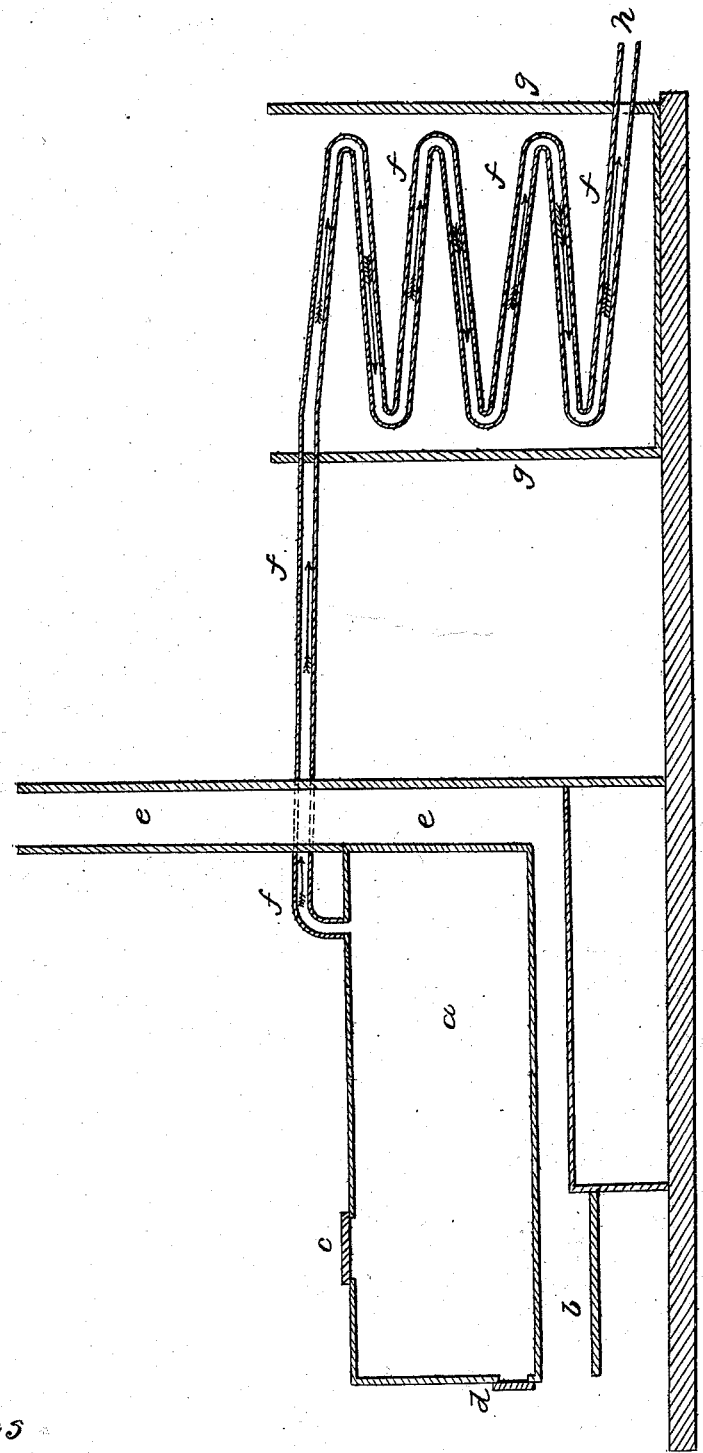

JAMES J. JOHNSTON, OF ALLEGHENY CITY, PENNSYLVANIA.

IMPROVEMENT IN THE DISTILLATION OF HYDROCARBON OILS.

Specification forming part of Letters Patent No. 31,982, dated April 9, 1861.

*To all whom it may concern:*

Be it known that I, JAMES J. JOHNSTON, of the city of Allegheny, in the county of Allegheny and State of Pennsylvania, have invented a new and useful Improvement in Distilling and Purifying Rock, Coal, and other Oils; and I do hereby declare that the following is a full and exact description thereof, reference being had to the accompanying drawing and the letters of reference marked thereon.

The nature of my invention consists in purifying, decolorizing, and deodorizing rock or petroleum oil by means of wood-charcoal and heat, said purifying, decolorizing, and deodorizing being done by one operation without any previous treatment of the oil before being put into the retort for distillation, and without any subsequent treatment, the whole operation being performed in the manner hereinafter described.

To enable others skilled in the art to make and use my invention, I will proceed to describe its construction and operation.

In the accompanying drawing, $a$ is the retort, which is furnished with openings $c$ and $d$. To the retort is attached a condensing-pipe, $f$, a greater part of which is covered with water in the vessel $g$.

$b$ is a furnace which is under the retort $a$.

$e$ is the chimney or flue of the furnace $b$.

The course of the vapor in the condensing-pipe is indicated by the red arrows. The opening $c$ is used for charging the retort with the charcoal and the oil, and the opening $d$ is used for drawing off the refuse after the process of distillation, purifying, decolorizing, and deodorizing is completed.

The operation of my improvement is as follows: I take the desired quantity of the oil in its natural condition, as taken from the earth, and without any previous treatment I put it into the retort. I then put in with the oil an equal quantity, by measurement, of charcoal. I then close up the retort perfectly tight, so that nothing will escape from it except through the condensing-pipe. I then apply heat to the retort and gradually increase it until I have obtained the desired degree of heat. When the heat is too great, the oil will not be so pure nor so much decolorized and deodorized as when the distillation is carried on with a moderate degree of heat. I have found that a less quantity of charcoal than that mentioned above (and that must be for a light grade of the unpurified oil) will not answer, and a heavy grade of the oil will require the quantity of charcoal to be increased in proportion to the increase in the weight of of the oil. Hard porous charcoal of commerce is the best, and should be in pieces about the size of an ordinary walnut, and should be screened, so as to free it from all dust. When care is not taken to have the charcoal prepared and cleared from dust, the dust will come off in the process of distillation, and thereby render the process imperfect. After the process of distillation is completed the oil will require no further treatment. A second distillation will cause a waste of the oil, and will add nothing to the value or quality of the oil. One charge of the charcoal will answer a number of times for distilling, and after the charcoal ceases to perform its functions in the process of purifying, decolorizing, and deodorizing of the oil it will then answer for fuel, burning freely, creating a quick fire and great heat.

I am aware that charcoal has been used for purifying rosin-oil; therefore I do not claim, broadly, its use.

Having thus described the nature and operation of my improvement, what I claim as of my invention, and desire to secure by Letters Patent of the United States, is—

The process and method of purifying, decolorizing, and deodorizing rock or petroleum oil by distilling it with common wood-charcoal in proportions substantially herein described.

JAMES J. JOHNSTON.

Witnesses:
C. A. CHAMBERLIN,
JAMES MILLER.